United States Patent
Cheng

(10) Patent No.: US 10,983,632 B2
(45) Date of Patent: Apr. 20, 2021

(54) FLOATING STATE DETERMINATION AND FLOATING COMPENSATION METHODS AND APPARATUSES FOR TOUCH SCREEN

(71) Applicant: SHENZHEN GOODIX TECHNOLOGY CO., LTD., Shenzhen (CN)

(72) Inventor: Deng Cheng, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/814,984

(22) Filed: Mar. 10, 2020

(65) Prior Publication Data

US 2020/0285385 A1 Sep. 10, 2020

Related U.S. Application Data

(63) Continuation of application No. PCT/CN2019/076865, filed on Mar. 4, 2019.

(51) Int. Cl.
*G06F 3/041* (2006.01)
*G06F 3/044* (2006.01)

(52) U.S. Cl.
CPC ........ *G06F 3/041662* (2019.05); *G06F 3/044* (2013.01)

(58) Field of Classification Search
CPC . G06F 3/041; G06F 3/045; G06F 3/02; G01R 27/26; G09G 5/00
See application file for complete search history.

(56) References Cited

U.S. PATENT DOCUMENTS

| 9,007,310 | B1* | 4/2015 | Olson | G06F 3/0448 |
| | | | | 345/173 |
| 10,095,324 | B2* | 10/2018 | Woo | G06F 3/03545 |
| 2009/0066669 | A1* | 3/2009 | Olson | G06F 3/04883 |
| | | | | 345/174 |

(Continued)

FOREIGN PATENT DOCUMENTS

| AU | 2012227270 B2 | 1/2015 |
| AU | 2014208225 B2 | 5/2016 |

(Continued)

*Primary Examiner* — Pegeman Karimi
(74) *Attorney, Agent, or Firm* — Brion Raffoul

(57) ABSTRACT

Disclosed are floating state determination and floating compensation methods and apparatuses for a touch screen. The floating state determination method includes: performing two times of self-capacitance interlaced driving on the touch screen in each of a driving direction and a sensing direction; calculating self-capacitance differences corresponding to the two times of self-capacitance interlaced driving in each of the driving direction and a sensing direction, and obtaining an interlaced differential value of each channel based on the self-capacitance differences; and calculating a self-capacitance differential value of each channel, and determining a floating level of the channel based on the result of calculation. The floating state determination method can determine a floating state of the touch screen, and then a floating compensation is performed based on the floating state, so that the capacitive screen can be operated normally under floating.

16 Claims, 9 Drawing Sheets

(56) References Cited

U.S. PATENT DOCUMENTS

| | | | | |
|---|---|---|---|---|
| 2013/0002579 A1* | 1/2013 | Hatano | ............... | G06F 3/04186 345/173 |
| 2013/0278543 A1* | 10/2013 | Hsu | .................... | G06F 3/04186 345/174 |
| 2015/0378467 A1 | 12/2015 | Hoch | | |

FOREIGN PATENT DOCUMENTS

| | | |
|---|---|---|
| AU | 2015202077 B2 | 4/2017 |
| CN | 107636596 A | 1/2018 |
| CN | 109254689 A | 1/2019 |
| EP | 2172834 A2 | 4/2010 |
| EP | 2759914 A1 | 7/2014 |
| WO | 2015023410 A1 | 2/2015 |

* cited by examiner

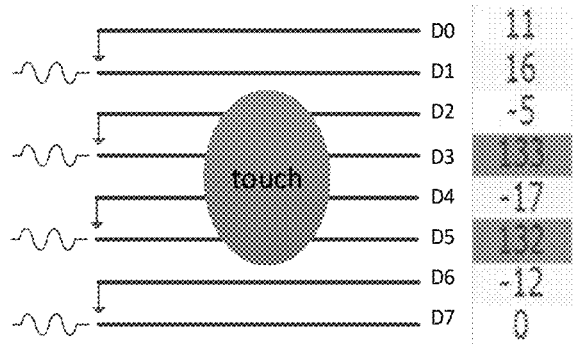

FIG. 6a

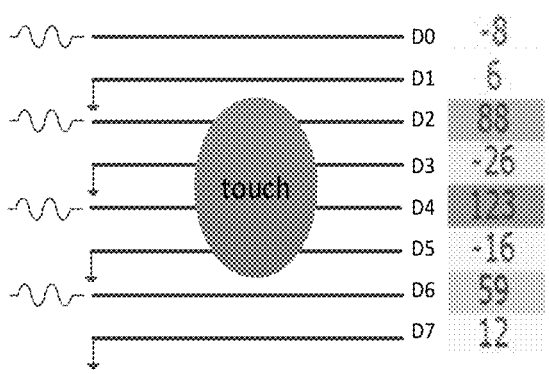

FIG. 6b

| Obtaining interlaced differential values on the driving lines based on the self-capacitance differences corresponding to the self-capacitance interlaced driving of the odd driving lines and the even driving lines in the driving lines | S21 |

↓

| Obtaining interlaced differential values on the sensing lines based on the self-capacitance differences corresponding to the self-capacitance interlaced driving of the odd-numbered sensing lines and the even-numbered sensing lines in the sensing lines | S22 |

FIG. 7

FLOATING STATE DETERMINATION AND FLOATING COMPENSATION METHODS AND APPARATUSES FOR TOUCH SCREEN

CROSS-REFERENCE TO RELATED APPLICATION

The present disclosure is a continuation of international application No. PCT/CN2019/076865, filed on Mar. 4, 2019, which is hereby incorporated by reference in its entirety.

TECHNICAL FIELD

The present disclosure relates to the technical field of touch screens, and in particular, relate to floating state determination and floating compensation methods and apparatuses for a touch screen.

BACKGROUND

Floating has always been one of the most common and difficult problems to solve for touch screen devices such as mobile phones. The floating problem seriously affects the touch performance of touch screens. When a touch screen device such as a mobile phone is in a floating environment and several fingers operate on a screen, the touch positions and number of fingers cannot be accurately identified, or the phenomena of coordinate jitter and point vanishing occur.

Generally, the above problems are mainly solved from the following two aspects: (1) In hardware design, the thickness of a cover is increased to increase the height of a channel layer on the touch screen and reduce the line width and pitch of each channel of the touch screen. (2) In software algorithms, the characteristics of finger data frames, the arrangement of the frames on the touch screen and the like are identified to combine the frames, reduce a touch threshold and the like, thereby optimizing the phenomena of coordinate point frame separation, jitter, point vanishing and the like.

However, the above methods neither determine the floating state of the touch screen, nor perform a floating compensation based on the floating state, so that the capacitive screen can be operated normally under floating, especially when operated by several fingers at the same time.

SUMMARY

In view of this, the present disclosure provides floating state determination and floating compensation methods and apparatuses for a touch screen, which can determine a floating state of the touch screen, and then perform a floating compensation based on the floating state, so that the capacitive screen can be operated normally under floating.

The present disclosure provides a floating state determination method for a touch screen, including: performing two times of self-capacitance interlaced driving on the touch screen in each of a driving direction and a sensing direction; calculating self-capacitance differences corresponding to the two times of self-capacitance interlaced driving in each of the driving direction and the sensing direction, and obtaining an interlaced differential value of each channel based on the self-capacitance differences; and calculating a self-capacitance differential value of each channel, and determining a floating level of the channel based on the result of calculation.

The present disclosure also provides a floating compensation method for a touch screen, including: performing two times of self-capacitance interlaced driving on the touch screen in each of a driving direction and a sensing direction; calculating self-capacitance differences corresponding to the two times of self-capacitance interlaced driving in each of a driving direction and the sensing direction, and obtaining an interlaced differential value of each channel based on the self-capacitance differences; calculating a self-capacitance differential value of each channel, and determining a floating level of the channel based on the result of calculation; and determining a compensation factor of each node based on the floating level of each channel, and performing floating compensation based on the compensation factor and a mutual capacitance difference compensation reference.

The present disclosure also provides an electronic device, including: one or more processors; and
a storage medium, configured to store one or more programs,
the one or more programs, when executed by the one or more processors, cause the one or more processors to implement the method according to any of the above embodiments.

The present disclosure also provides a computer-readable medium storing a computer program thereon, where when the program is executed by a processor, the method described in any of the above embodiments is implemented.

It can be seen from the above technical solutions that two times of self-capacitance interlaced driving are performed on the touch screen in each of a driving direction and a sensing direction, self-capacitance differences corresponding to the two times of self-capacitance interlaced driving are calculated respectively, an interlaced differential value of each channel is obtained, and a floating level of each channel is determined by calculating a self-capacitance differential value of each channel. Therefore, the floating level of each channel can be determined from the floating state of each channel of the touch screen in the present disclosure. The present disclosure determines a compensation factor of each node based on the floating level of each channel, and performs floating compensation based on the compensation factor and the mutual capacitance difference compensation reference. The present disclosure performs floating compensation based on the floating state, so that the capacitive screen can be operated normally under floating, especially when operated by several fingers at the same time.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show only some embodiments of the present disclosure, and a person of ordinary skill in the art may still derive other drawings from these accompanying drawings.

FIG. 6a and FIG. 6b are schematic diagrams of an odd-numbered scheme and an even-numbered driving scheme according to the present disclosure, respectively;

FIG. 7 is a flowchart of step S2 of an embodiment of the floating state determination method for a touch screen according to the present disclosure;

DETAILED DESCRIPTION

According to the present disclosure, two times of self-capacitance interlaced driving are performed on the touch screen in each of a driving direction and a sensing direction, self-capacitance differences corresponding to the two times of self-capacitance interlaced driving are calculated respectively, an interlaced differential value of each channel is obtained, and a floating level of each channel is determined by calculating a self-capacitance differential value of each channel. Therefore, the floating level of each channel can be determined from the floating state of each channel of the touch screen in the present disclosure. The present disclosure determines a compensation factor of each node based on the floating level of each channel, and performs floating compensation based on the compensation factor and a mutual capacitance difference compensation reference. The present disclosure performs floating compensation based on the floating state, so that the capacitive screen can be operated normally under floating, especially when operated by several fingers at the same time.

Nevertheless, it is not necessary to require that any technical solution of the present disclosure achieves all of the above advantages at the same time.

For better understanding of the technical solutions in the present disclosure by a person skilled in the art, the technical solutions in the present disclosure are clearly and completely described with reference to the accompanying drawings in the embodiments of the present disclosure. Apparently, the described embodiments are only a part of the embodiments of the present disclosure, rather than the entire embodiments. All other embodiments obtained by those of ordinary skill in the art based on the embodiments of the present disclosure shall fall within the protection scope of the present disclosure.

The following further describes specific implementations of the present disclosure with reference to the accompanying drawings.

Figure 1:
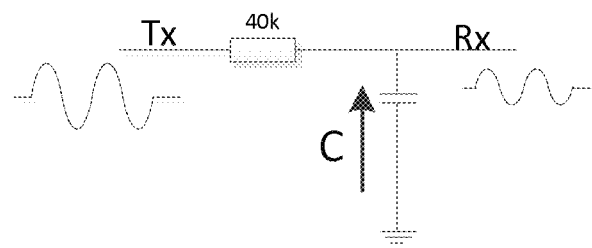
FIG. 1 is a schematic diagram of a simplified self-capacitance detection model of a touch screen.

Self-capacitance of a touch screen refers to a capacitance between a sensing electrode of the touch screen and a reference ground. Because a capacitance exists between a person and the reference ground, when a finger touches the sensing electrode Tx, a coupling capacitance is formed between the finger and the sensing electrode Tx of the touch screen, resulting in an increase in self-capacitance. Therefore, whether the touch screen is touched by a finger can be detected through this characteristic. A simplified model of self-capacitance detection of the touch screen is shown in FIG. 1.

Figure 2:
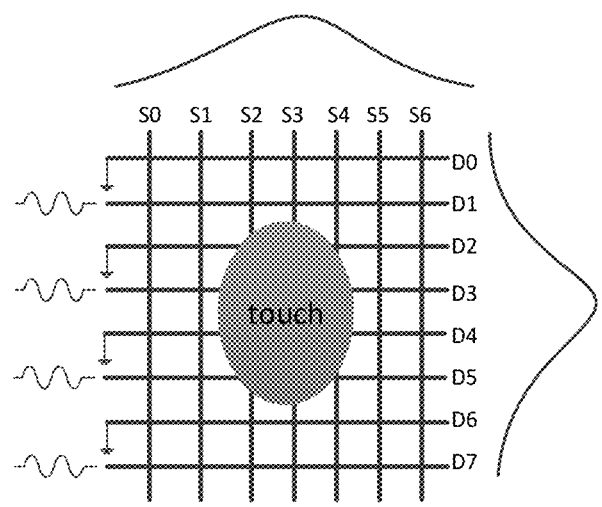
FIG. 2 is a schematic diagram of a self-capacitance interlaced driving model of driving lines.

FIG. 2 shows a driving line self-capacitance interlaced driving model. When acquiring from driving lines in a manner of alternating input of excitation signals and grounding, and sensing grounding, that is, D1, D3, D5 . . . Dn ends input excitation signals, D0, D2, D4 . . . Dn are grounded, S0, S1, S2 . . . Sn are grounded, and this driving method is a self-capacitance interlaced driving method in a driving direction. Similarly, when acquiring from sensing lines in a manner of alternating input of excitation signals and grounding, and drive grounding, that is, S1, S3, S5 . . . Sn input excitation signals, S0, S2, S4 . . . Sn are grounded, D0, D1, D2 . . . Dn are grounded, and this driving method is a self-capacitance interlaced driving method in a sensing direction.

Figure 3:
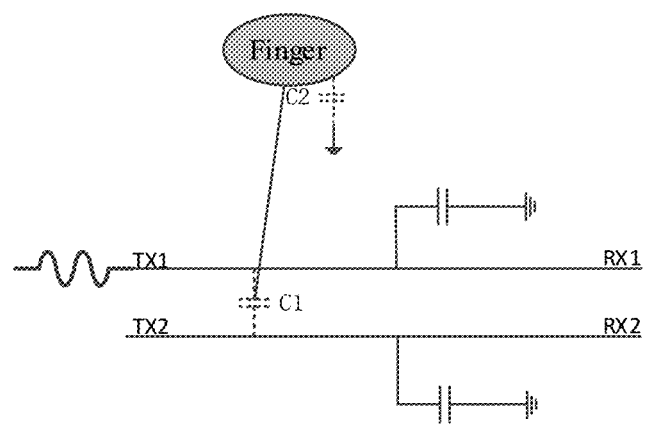
FIG. 3 is a signal change diagram of self-capacitance interlaced driving.

FIG. 3 shows a signal change diagram of self-capacitance interlaced driving, where Tx1 and Tx2 are driving lines or sensing lines, and Rx1 and Rx2 are signal receiving ends corresponding to Tx1 and Tx2 respectively. Tx1 inputs excitation signals and Tx2 is grounded. When a finger touches the touch screen, a capacitor C1 couples the signals on Tx1 to Tx2, so Rx2 receives a signal amount coupled by C1; and at the same time, C2 introduce some signals of Tx1 and Tx2 to the ground. Therefore, when the finger touches the touch screen, the signal amounts on Rx1 and Rx2 change.

It can be seen that for Tx1 with input signals, since both C1 and C2 reduce the signal amount of Rx1, the value detected by Rx1 is smaller than the original, and the driving line or sensing line corresponding to Rx1 has a positive change amount. For the driving line or sensing line corresponding to the grounded Tx2, the following situations need to be discussed:

① In a non-floating case, C2 is much larger than C1, at this time, like Tx1, most of the signal amount of Tx2 is introduced into the ground, the detected signal amount of Rx2 is smaller than the original, the change amounts of Rx1 and Rx2 are equivalent, and the driving line or sensing line corresponding to Tx2 has a positive change amount.

② In a floating case, C2 changes under the influence of floating, and the more severe the floating is, the smaller the C2 is. Considering extreme floating, C2 is very small, the capacitor C1 couples the signals on Tx1 to Tx2, while C2 can only introduce a small part of the signals on Tx2 to the ground, resulting in a larger amount of signals received by Rx2 than when there is no touch, so that the driving line or sensing line corresponding to Tx2 has a negative change amount. Therefore, the signal change amounts of the signal receiving ends corresponding to three consecutive driving lines or sensing lines have a "positive-negative-positive" alternating phenomenon. In a case of less severe floating, C2 is not too small, and C2 can introduce some signals on Tx2 to the ground, resulting in a smaller amount of signals received by Rx2 than when there is no touch, but still smaller than that detected on Rx1. Therefore, the signals at the signal receiving ends corresponding to the three consecutive driving lines or sensing lines have a "large-small-large" phenomenon on the whole. From the above analysis, it can be known that the more severe the floating is, the smaller the C2 is, and the more obvious the "large-small-large" data feature change detected at the Rx end is. Hence, the floating can be identified through this change feature, and the degree of floating can be quantified.

Figure 4:
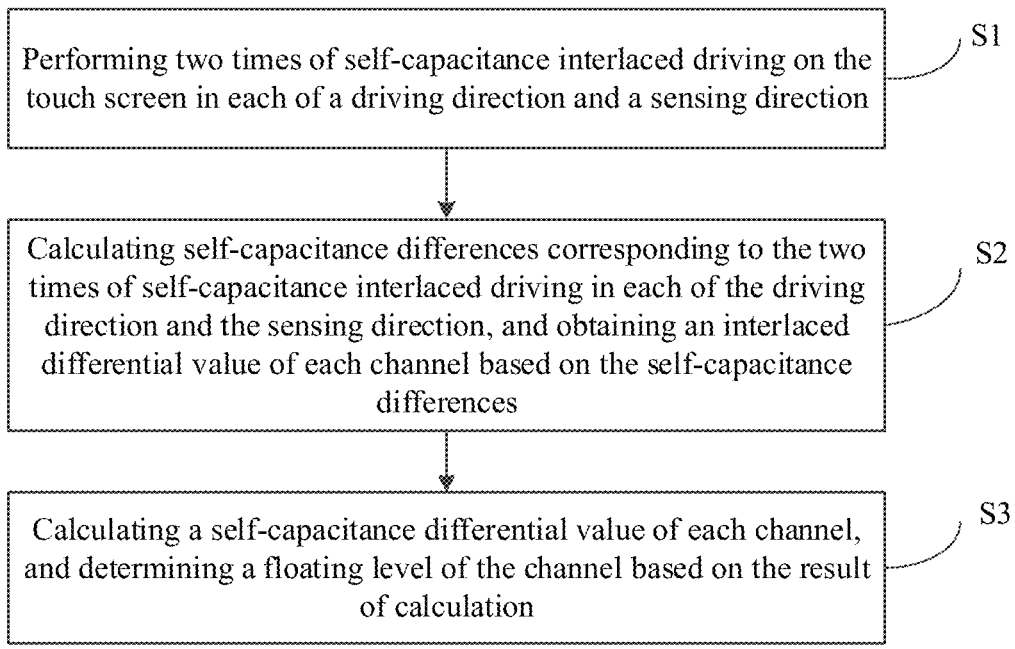
FIG. 4 is a flowchart of an embodiment of a floating state determination method for a touch screen according to the present disclosure.

Referring to FIG. 4, an embodiment of the present disclosure provides a floating state determination method for a touch screen, including:

S1: performing two times of self-capacitance interlaced driving on the touch screen in each of a driving direction and a sensing direction.

Figure 5:
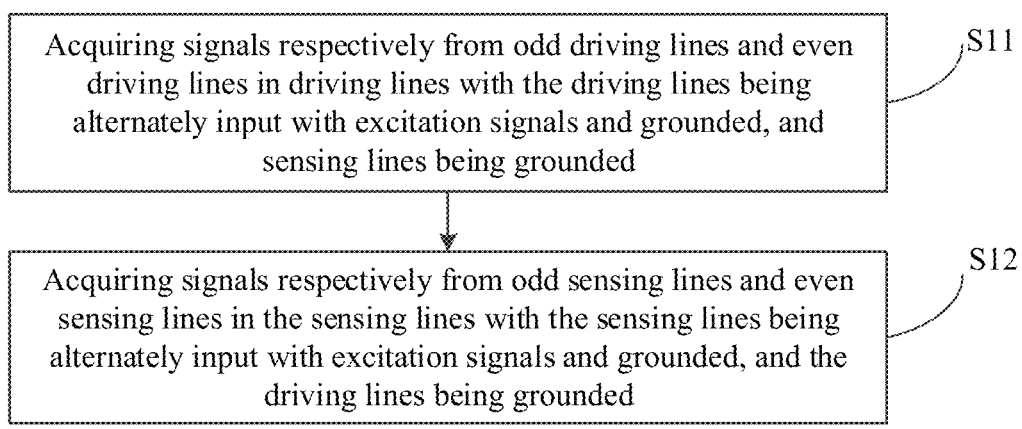
FIG. 5 is a flowchart of step S1 of an embodiment of the floating state determination method for a touch screen according to the present disclosure.

In a specific implementation of the present disclosure, referring to FIG. 5, step S1 includes:

S11: acquiring signals respectively from odd-numbered driving lines and even-numbered driving lines in driving lines with the driving line being alternately input with excitation signals and grounded, and sensing lines being grounded.

S12: acquiring signals respectively from odd-numbered sensing lines and even-numbered sensing lines in the sensing lines with the sensing lines being alternately input with excitation signals and grounded, and the driving lines being grounded.

Specifically, referring to FIG. 6a and FIG. 6b, the odd-numbered driving lines (sensing lines) are first driven and then the even-numbered driving lines are driven. For each channel, the signal amount during being driven and being grounded can be obtained. Thereby the floating level of this channel is quantified. FIG. 6a and FIG. 6b schematically show the signal change amounts that can be obtained.

S2: calculating self-capacitance differences corresponding to the two times of self-capacitance interlaced driving in each of the driving direction and the sensing direction, and obtaining an interlaced differential value of each channel based on the self-capacitance differences.

In another specific implementation of the present disclosure, referring to FIG. 7, step S2 includes:

S21: obtaining interlaced differential values on the driving lines based on the self-capacitance differences corresponding to self-capacitance interlaced driving of the odd-numbered driving lines and the even-numbered driving lines in the driving lines.

S22: obtaining interlaced differential values on the sensing lines based on the self-capacitance differences corresponding to self-capacitance interlaced driving of the odd-numbered sensing lines and the even-numbered sensing lines in the sensing lines.

Figure 8A:
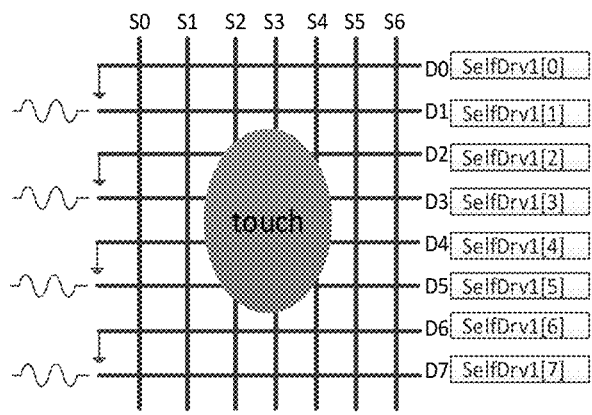
FIG. 8a and FIG. 8b are schematic diagrams of two times of interlaced driving in a driving direction according to the present disclosure, respectively.
Figure 8B:
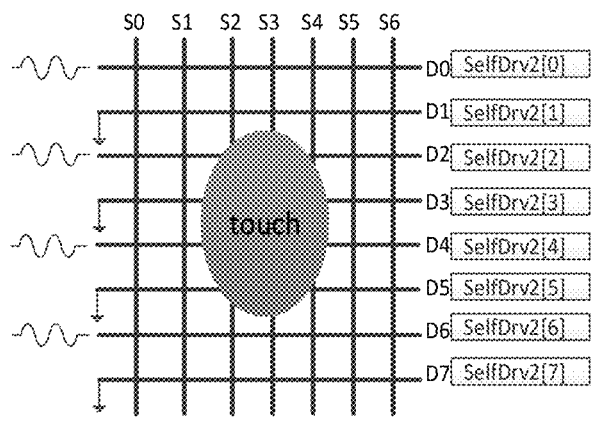

Two groups of self-capacitance interlaced driving are performed in the driving direction and the sensing direction respectively. Referring to FIG. 8a and FIG. 8b, the driving direction is taken as an example:

(1) Driving lines [D1, D3, D5 ... Dn] are driven, [D0, D2, D4 ... Dn] are grounded, and sensing lines [S0, S1, S2 ... Sn] are all grounded to obtain a group of interlaced driving self-capacitance differences SelfDrv1 [0~n] on the driving lines.

(2) Driving lines [D0, D2, D4 ... Dn] are driven, [D1, D3, D5 ... Dn] are grounded, and sensing lines [S0, S1, S2 ... Sn] are all grounded to obtain another group of interlaced driving self-capacitance differences SelfDrv2 [0~n] on the driving lines.

Through the above two groups of self-capacitance differences, a group of interlaced differential values SelfDrvDiffer [0~n] between the driving lines can be obtained.

The method of obtaining interlaced differential values between the sensing lines is the same as above, and details are not described herein again.

S3: calculating a self-capacitance differential value of each channel, and determining a floating level of the channel based on the result of calculation.

Figure 9:
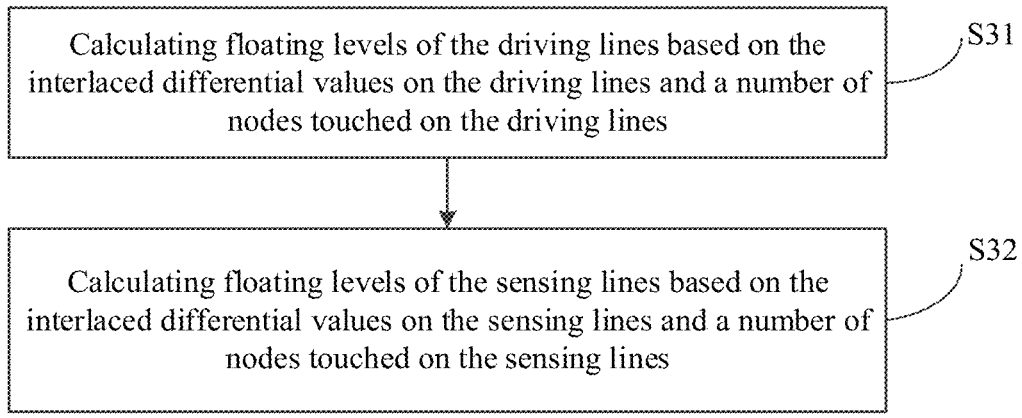
FIG. 9 is a flowchart of step S3 of an embodiment of the floating state determination method for a touch screen according to the present disclosure.

In another specific implementation of the present disclosure, referring to FIG. 9, step S3 includes:

S31: calculating floating levels of the driving lines based on the interlaced differential values on the driving lines and a number of nodes touched on the driving lines.

S32: calculating floating levels of the sensing lines based on the interlaced differential values on the sensing lines and a number of nodes touched on the sensing lines.

Specifically, the sum of signal change amounts caused by floating factors on all actual touch nodes of each driving line channel can be reflected by the group of self-capacitance differential values SelfDrvDiffer [0~n]. Formula (1) can be used to quantify the floating level on the driving line:

$$\text{Ratio}_D[i]=\text{SelfDrvDriver}[i]/\text{TouchNum}[i] i\in(0,n) \quad (1)$$

Where TouchNum[i] represents the number of nodes touched on the driving line, and $\text{Ratio}_D[i]$ represents the floating factor of the driving line and is used to quantify the floating level of the channel.

Similarly, the floating factor $\text{Ratio}_S[i]$ on each sensing line can be obtained by two times of self-capacitance interlaced driving in the sensing direction, and is used to quantify the floating level of the sensing channel.

It can be seen from the above technical solution that two times of self-capacitance interlaced driving are performed on the touch screen in a driving direction and a sensing direction respectively, self-capacitance differences corresponding to the two times of self-capacitance interlaced driving are calculated respectively, an interlaced differential value of each channel is obtained, and a floating level of each channel is determined by calculating a self-capacitance differential value of each channel. Therefore, the level floating state of each channel can be determined from the floating state of each channel of the touch screen in the present disclosure.

Figure 10:
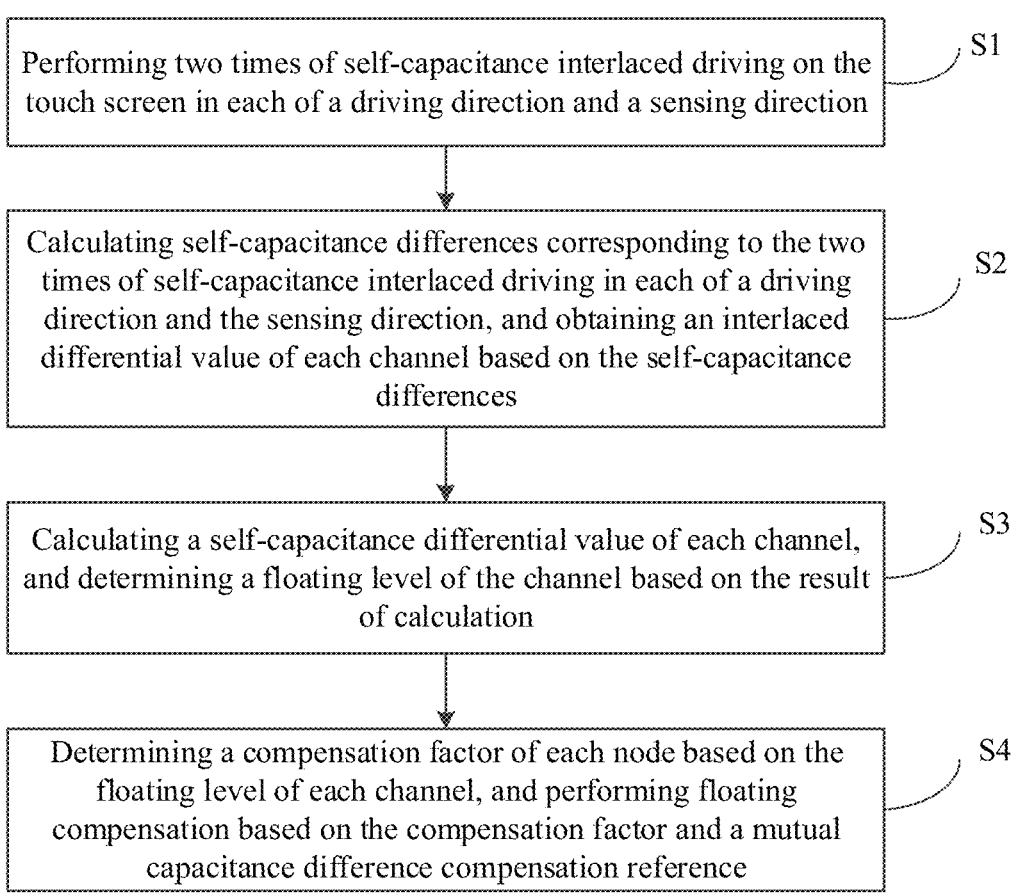
FIG. 10 is a flowchart of an embodiment of a floating compensation method for a touch screen according to the present disclosure.

Referring to FIG. 10, another embodiment of the present disclosure further provides a floating compensation method for a touch screen. The method includes the above steps S1-S3, and further includes the following steps:

S4: determining a compensation factor of each node based on the floating level of each channel, and performing floating compensation based on the compensation factor and a mutual capacitance difference compensation reference.

Figure 11:
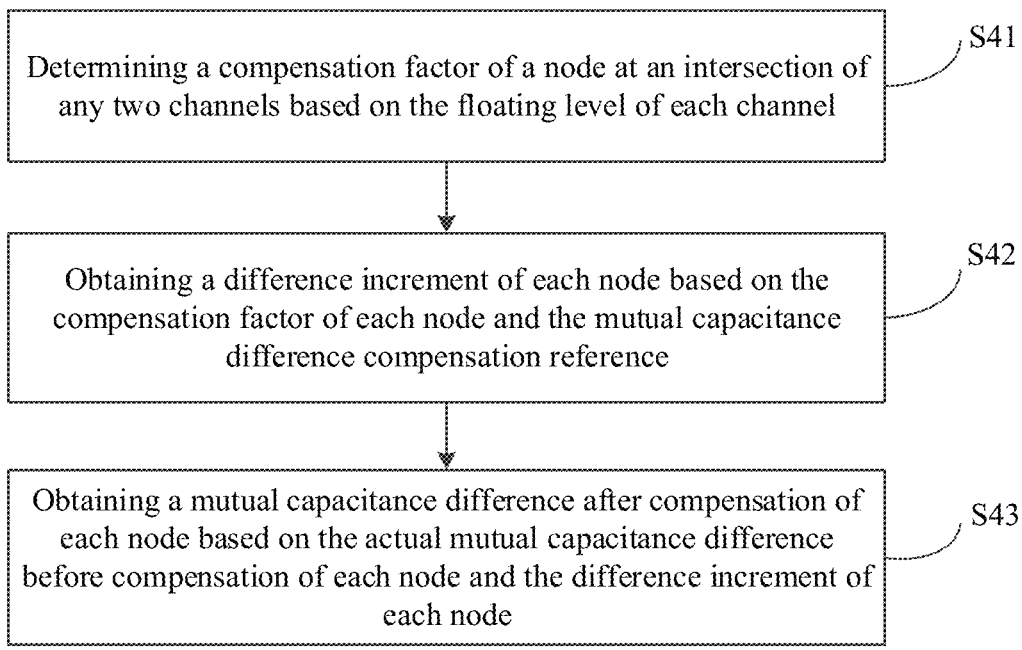
FIG. 11 is a flowchart of step S4 of an embodiment of the floating compensation method for a touch screen according to the present disclosure.

In another specific implementation of the present disclosure, referring to FIG. 11, step S4 includes:

S41: determining a compensation factor of a node at an intersection of any two channels based on the floating level of each channel.

Specifically, the calculation method of the compensation factor is as shown in formula (2).

$$Ratio_{index} = Ratio_D * Ratio_S \quad (2)$$

Figure 12:
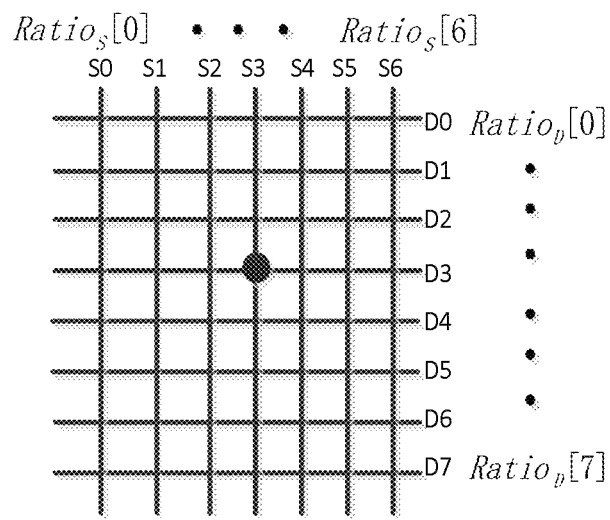
FIG. 12 is a schematic diagram of mutual capacitance compensation of a node in the floating compensation method for a touch screen according to the present disclosure.

Referring to FIG. 12, the node is uniquely determined by the driving sequence number D and the sensing sequence number S, that is, the intersection of two channels. $Ratio_{index}$ represents the compensation factor of the node, and is uniquely determined by the floating level $Ratio_D$ of the driving line of the driving sequence number D and the floating level $Ratio_S$ of the sensing line of the sensing sequence number S. Therefore, the higher the floating levels of the driving line and the sensing line are, the larger the compensation factor of the node is, and the better the problem of reduction of the mutual capacitance signal amount due to floating can be compensated.

S42: obtaining a difference increment of each node based on the compensation factor of each node and the mutual capacitance difference compensation reference.

S43: obtaining a mutual capacitance difference after compensation of each node based on the actual mutual capacitance difference before compensation of each node and the difference increment of each node.

Referring to FIG. 12, all the nodes to be compensated are traversed, and the expression of the mutual capacitance difference of the node is formula (3):

$$FinalDiff_{index} = CurDiff_{index} + IncDiffBase_{index} * Ratio_{index} \quad (3)$$

In which:

$FinalDiff_{index}$ represents the mutual capacitance difference after node compensation;

$CurDiff_{index}$ represents the actual mutual capacitance difference before node compensation;

$Ratio_{index}$ is defined as the compensation factor of the node;

$IncDiffBase_{index}$ represents the mutual capacitance difference compensation reference of the current node.

The mutual capacitance difference compensation reference is a variable value set when the touch screen is not affected by floating factors.

Through the above calculation rule, that is, on the premise of quantifying the floating level, the reduction of the mutual capacitance signal amount caused by floating can be compensated.

The present disclosure determines a compensation factor of each node based on the floating level of each channel, and performs floating compensation based on the compensation factor and the mutual capacitance difference compensation reference. The present disclosure performs floating compensation based on the floating state, so that the capacitive screen can be operated normally under floating, especially when operated by several fingers at the same time.

Figure 13:
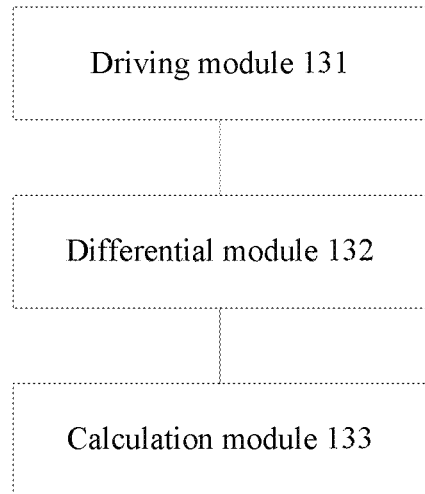
FIG. 13 is a structural diagram of an embodiment of a floating state determination apparatus for a touch screen according to the present disclosure.

Referring to FIG. 13, an embodiment of the present disclosure provides a floating state determination apparatus for a touch screen, including:

a driving module 131, configured to perform two times of self-capacitance interlaced driving on the touch screen in each of a driving direction and a sensing direction;

a differential module 132, configured to calculate self-capacitance differences corresponding to the two times of self-capacitance interlaced driving in each of the driving direction and the sensing direction, and obtain an interlaced differential value of each channel based on the self-capacitance differences; and a calculation module 133, configured to calculate a self-capacitance differential value of each channel, and determine a floating level of the channel based on the result of calculation.

Figure 14:
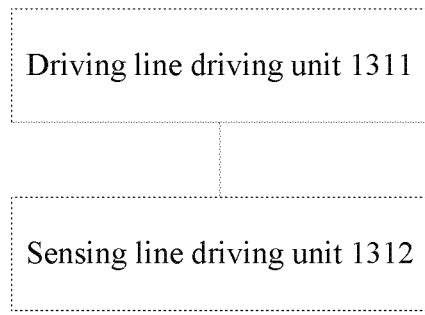
FIG. 14 is a structural diagram of a driving module of an embodiment of the floating state determination apparatus for a touch screen according to the present disclosure.

In a specific implementation of the present disclosure, referring to FIG. 14, the driving module 131 includes:

a driving line driving unit 1311, configured to acquire signals from odd-numbered driving lines and even-numbered driving lines in driving lines respectively with the driving lines being alternately input with excitation signals and grounded, and the sensing lines being grounded; and a sensing line driving unit 1312, configured to acquire signals from odd-numbered sensing lines and even-numbered sensing lines in the sensing lines respectively with the sensing lines being alternately input with excitation signals and grounded, and the driving lines being grounded.

Specifically, referring to FIG. 6a and FIG. 6b, the odd-numbered driving lines (sensing lines) are first driven and then the even-numbered driving lines are driven. For each channel, the signal amount during being driven and being grounded can be obtained. Thereby the floating level of this channel is quantified. FIG. 6a and FIG. 6b schematically show the signal change amounts that can be obtained.

Figure 15:
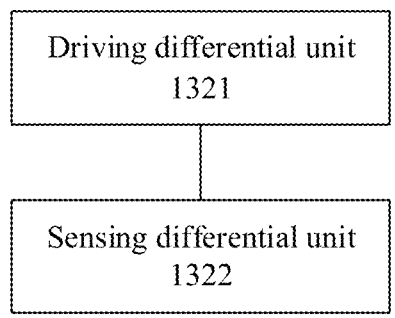
FIG. 15 is a structural diagram of a differential module of an embodiment of the floating state determination apparatus for a touch screen according to the present disclosure.

In another specific implementation of the present disclosure, referring to FIG. 15, the differential module 132 includes:

a driving differential unit 1321, configured to obtain interlaced differential values on the driving lines based on the self-capacitance differences corresponding to the self-capacitance interlaced driving of the odd-numbered driving lines and the even-numbered driving lines in the driving lines; and A sensing differential unit 1322, configured to obtain interlaced differential values on the sensing lines based on the self-capacitance differences corresponding to the self-capacitance interlaced driving of the odd-numbered sensing lines and the even-numbered sensing lines in the sensing lines.

Two groups of self-capacitance interlaced driving are performed in the driving direction and the sensing direction respectively. Referring to FIG. 8a and FIG. 8b, the driving direction is taken as an example:

(1) Driving lines [D1, D3, D5 . . . Dn] are driven, [D0, D2, D4 . . . Dn] are grounded, and sensing lines [S0, S1, S2 . . . Sn] are all grounded to obtain a group of interlaced driving self-capacitance differences SelfDrv1 [0~n] on the driving lines.

(2) Driving lines [D0, D2, D4 . . . Dn] are driven, [D1, D3, D5 . . . Dn] are grounded, and sensing lines [S0, S1, S2 . . . Sn] are all grounded to obtain another group of interlaced driving self-capacitance differences SelfDrv2 [0~n] on the driving lines.

Through the above two groups of self-capacitance differences, a group of interlaced differential values SelfDrvDiffer [0~n] between the driving lines can be obtained.

The method of obtaining interlaced differential values between the sensing lines is the same as above, and details are not described herein again.

Figure 16:
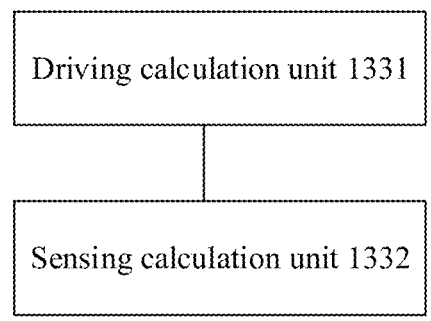
FIG. 16 is a structural diagram of a calculation module of an embodiment of the floating state determination apparatus for a touch screen according to the present disclosure.

In another specific implementation of the present disclosure, referring to FIG. 16, the calculation module 133 includes:

a driving calculation unit 1331, configured to calculate floating levels of the driving lines based on the interlaced differential values on the driving lines and a number of nodes touched on the driving lines; and a sensing calculation unit 1332, configured to calculate floating levels of the sensing lines based on the interlaced differential values on the sensing lines and a number of nodes touched on the sensing lines.

Specifically, the sum of signal change amounts caused by floating factors on all actual touch nodes of each driving line channel can be reflected by the group of self-capacitance differential values SelfDrvDiffer [0~n]. Formula (1) can be used to quantify the floating level on the driving line:

$$\text{Ratio}_D[i]=\text{SelfDrvDriver}[i]/\text{TouchNum}[i] \quad i\in(0,n) \quad (1)$$

Where TouchNum[i] represents the number of nodes touched on the i-th driving line, and $\text{Ratio}_D[i]$ represents the floating factor of the driving line and is used to quantify the floating level of the channel.

Similarly, the floating factor $\text{Ratio}_S[i]$ on each sensing line can be obtained by two times of self-capacitance interlaced driving in the sensing direction, and is used to quantify the floating level of the sensing channel.

It can be seen from the above technical solution that two times of self-capacitance interlaced driving are performed on the touch screen in a driving direction and a sensing direction respectively, self-capacitance differences corresponding to the two times of self-capacitance interlaced driving are calculated respectively, an interlaced differential value of each channel is obtained, and a floating level of each channel is determined by calculating a self-capacitance differential value of each channel. Therefore, the level floating state of each channel can be determined from the floating state of each channel of the touch screen in the present disclosure.

Figure 17:
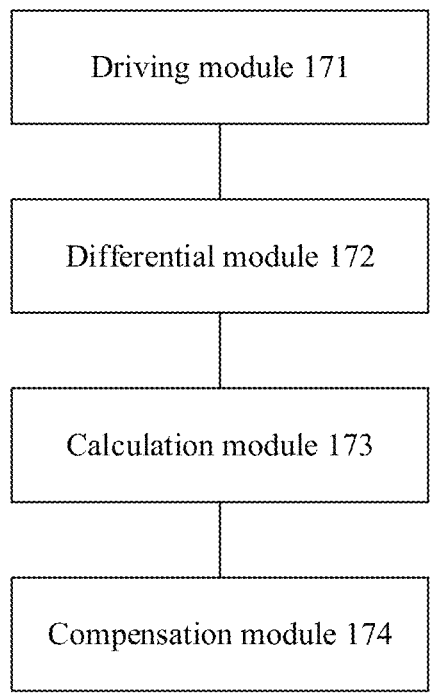
FIG. 17 is a structural diagram of an embodiment of a floating compensation apparatus for a touch screen according to the present disclosure.

Referring to FIG. 17, another embodiment of the present disclosure further provides a floating compensation apparatus for a touch screen, including the driving module 171, the differential module 172 and the calculation module 173, and further includes:

a compensation module 174, configured to determine a compensation factor of each node based on the floating level of each channel, and perform floating compensation based on the compensation factor and a mutual capacitance difference compensation reference.

Figure 18:
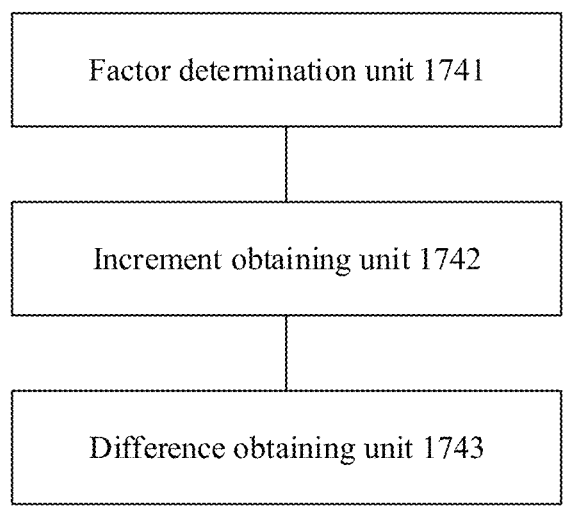
FIG. 18 is a structural diagram of a compensation module of an embodiment of the floating compensation apparatus for a touch screen according to the present disclosure.

In another specific implementation of the present disclosure, referring to FIG. 18, the compensation module 174 includes:

a factor determination unit 1741, configured to determine a compensation factor of a node at an intersection of any two channels based on the floating level of each channel;

an increment obtaining unit 1742, configured to obtain a difference increment of each node based on the compensation factor of each node and the mutual capacitance difference compensation reference; and a difference obtaining unit 1743, configured to obtain a mutual capacitance difference after compensation of each node based on the actual mutual capacitance difference before compensation of each node and the difference increment of each node.

Specifically, the calculation method of the compensation factor is as shown in formula (2).

$$\text{Ratio}_{index}=\text{Ratio}_D*\text{Ratio}_S \quad (2)$$

Referring to FIG. 12, the node is uniquely determined by the driving sequence number D and the sensing sequence number S, that is, the intersection of two channels. $\text{Ratio}_{index}$ represents the compensation factor of the node, and is uniquely determined by the floating level $\text{Ratio}_D$ of the driving line of the driving sequence number D and the floating level $\text{Ratio}_S$ of the sensing line of the sensing sequence number S. Therefore, the higher the floating levels of the driving line and the sensing line are, the larger the compensation factor of the node is, and the better the problem of reduction of the mutual capacitance signal amount due to floating can be compensated.

Referring to FIG. 12, all the nodes to be compensated are traversed, and the expression of the mutual capacitance difference of the node is formula (3):

$$\text{FinalDiff}_{index}=\text{CurDiff}_{index}+\text{IncDiffBase}_{index}*\text{Ratio}_{index} \quad (3)$$

In which:

$\text{FinalDiff}_{index}$ represents the mutual capacitance difference after node compensation;

$\text{CurDiff}_{index}$ represents the actual mutual capacitance difference before node compensation;

$\text{Ratio}_{index}$ defined as the compensation factor of the node;

$\text{IncDiffBase}_{index}$ represents the mutual capacitance difference compensation reference of the current node.

The mutual capacitance difference compensation reference is a variable value set when the touch screen is not affected by floating factors.

Through the above calculation rule, that is, on the premise of quantifying the floating level, the reduction of the mutual capacitance signal amount caused by floating can be compensated.

The present disclosure determines a compensation factor of each node based on the floating level of each channel, and performs floating compensation based on the compensation factor and the mutual capacitance difference compensation reference. The present disclosure performs floating compensation based on the floating state, so that the capacitive screen can be operated normally under floating, especially when operated by several fingers at the same time.

Figure 19:
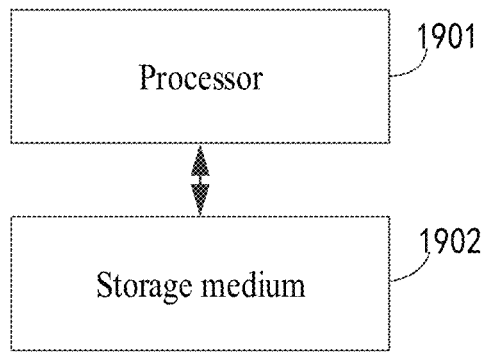
FIG. 19 is a schematic structural diagram of an electronic device applied in the present disclosure.

FIG. 19 is a schematic structural diagram of an electronic device according to the present disclosure. The electronic device may be a user terminal, and may include:

one or more processors 1901; and a storage medium 1902, which may be configured to store one or more programs, the one or more programs, when executed by the one or more processors, cause the one or more processors to implement the method according to any of the above embodiments.

In particular, according to the embodiments of the present disclosure, the process described above with reference to the flowchart may be implemented in a computer software program. For example, an embodiment of the present disclosure includes a computer program product including a computer program loaded to a computer-readable medium, the computer program including program code configured to execute the method shown in the flowchart. In such an embodiment, the computer program may be downloaded and installed from a network via a communication portion, and/or installed from a removable medium. When the computer program is executed by a central processing unit (CPU), the functions defined in the method of the embodiments of the present disclosure are executed. It should be noted that the computer-readable medium of the present disclosure may be a computer-readable signal medium or a computer-readable storage medium or a combination of the two. An example of the computer-readable medium may be, but is not limited to: electric, magnetic, optical, electromagnetic, infrared, or semiconductor systems, apparatuses, elements, or any combination of the above. A more specific example of the computer-readable storage medium may include but is not limited to: an electrical connection with one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory, or any suitable combination of the above. In the present disclosure, the computer-readable storage medium may be any tangible medium containing or storing programs which may be used by an instruction execution system, apparatus or device or incorporated thereto. In the present disclosure, the computer-readable signal medium may include data signals in a baseband or propagated as parts of carriers, in which computer-readable program code is carried. The data signals propagated may be in multiple forms, including but not limited to electromagnetic signals, optical signals or any appropriate combination of them. The computer-readable signal medium may also be any computer-readable medium beyond the computer-readable storage medium. The computer-readable medium is capable of sending, propagating or transmitting a program used by an instruction execution system, apparatus or device or a combination of them. The program code included in the computer-readable medium may be transmitted by any appropriate medium, including but not limited to wireless, wired, optical cable, RF, etc., or any appropriate combination of them.

Computer program code for executing operations in the present disclosure may be compiled using one or more programming languages or combinations thereof. The programming languages include object-oriented programming languages, such as Java, Smalltalk or C++, and also include a conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including a local area network (LAN) or a wide area network (WAN), or may be connected to an external computer (for example, connected through Internet using an Internet service provider).

The flowcharts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, the module, program segment, or the code portion including one or more executable instructions configured to implement specified logic functions. There are specific sequence relationships in the above specific embodiments, but these sequence relationships are only exemplary. In specific implementations, these steps may be fewer, more or the execution order may be adjusted. In some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: performing two times of self-capacitance interlaced driving on the touch screen in each of a driving direction and a sensing direction; calculating self-capacitance differences corresponding to the two times of self-capacitance interlaced driving in each of the driving direction and the sensing direction, and obtaining an interlaced differential value of each channel based on the self-capacitance differences; and calculating a self-capacitance differential value of each channel, and determining a floating level of the channel based on the result of calculation.

The units involved in the embodiments of the present disclosure may be implemented by means of software or hardware. The described units may also be provided in a processor, for example, described as: performing two times of self-capacitance interlaced driving on the touch screen in each a driving direction and a sensing direction; calculating self-capacitance differences corresponding to the two times of self-capacitance interlaced driving in each the driving direction and the sensing direction, and obtaining an interlaced differential value of each channel based on the self-capacitance differences; calculating a self-capacitance differential value of each channel, and determining a floating level of the channel based on the result of calculation; and determining a compensation factor of each node based on the floating level of each channel, and performing floating compensation based on the compensation factor and a mutual capacitance difference compensation reference.

As another aspect, the present disclosure also provides a computer-readable medium storing a computer program, where when the program is executed by a processor, the method described in any of the above embodiments is implemented.

As another aspect, the present disclosure also provides a computer-readable medium. The computer-readable medium may be included in the apparatus described in the above embodiments, or a stand-alone computer-readable medium not assembled into the apparatus. The computer-readable medium stores one or more programs, and when the one or more programs are executed by the apparatus, the apparatus is caused to: perform two times of self-capacitance interlaced driving on the touch screen in each of a driving direction and a sensing direction; calculate self-capacitance differences corresponding to the two times of self-capacitance interlaced driving in each of the driving direction and the sensing direction, and obtain an interlaced differential value of each channel based on the self-capacitance differences; and calculate a self-capacitance differential value of each channel, and determine a floating level of the channel based on the result of calculation.

As another aspect, the present disclosure also provides a computer-readable medium. The computer-readable medium may be included in the apparatus described in the above embodiments, or a stand-alone computer-readable medium not assembled into the apparatus. The computer-readable medium stores one or more programs, and when the one or more programs are executed by the apparatus, the apparatus is caused to: perform two times of self-capacitance interlaced driving on the touch screen in each of a driving direction and a sensing direction; calculate self-capacitance differences corresponding to the two times of self-capacitance interlaced driving in each of the driving direction and the sensing direction, and obtain an interlaced differential value of each channel based on the self-capacitance differences; calculate a self-capacitance differential value of each channel, and determine a floating level of the channel based on the result of calculation; and determine a compensation factor of each node based on the floating level of each channel, and perform floating compensation based on the compensation factor and a mutual capacitance difference compensation reference.

The expressions "first", "second", "the first", or "the second" used in various embodiments of the present disclosure may modify various components regardless of order and/or importance, but these expressions do not limit the corresponding components. The above expressions are only configured for the purpose of distinguishing elements from other elements. For example, the first user equipment and the second user equipment represent different user equipment, although the both are user equipment. For example, a first element may be referred to as a second element, and similarly, a second element may be referred to as a first element, without departing from the scope of the present disclosure.

When one element (for example, a first element) is "(operably or communicably) coupled with" the other element (for example, a second element) or "(operably or communicably) coupled to" the other element (for example, a second element) or "connected to" the other element (for example, a second element), it should be understood that the one element is directly connected to the other element or the one element is indirectly connected to the other element via another element (for example, a third element). On the contrary, it can be understood that when an element (for example, a first element) is "directly connected to" or "directly coupled to" the other element (a second element), no element (for example, a third element) is inserted between the two.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical solutions formed by the above-described features being interchanged with, but not limited to, technical features with similar functions disclosed in the present disclosure are examples.

What is claimed is:

1. A method for determining a floating state of a touch screen, comprising:
    performing two times of self-capacitance interlaced driving on the touch screen in a driving direction, wherein the performing two times of self-capacitance driving on the touch screen in a driving direction further comprises: acquiring signals from odd-numbered driving lines and even-numbered driving lines respectively in driving lines of the touch screen with the driving lines being input with excitation signals and grounded alternately, and sensing lines of the touch screen being grounded;
    performing two times of self-capacitance interlaced driving on the touch screen in a sensing direction, wherein the performing two times of self-capacitance driving on the touch screen in a sensing direction further comprises: acquiring signals from odd-numbered sensing lines and even-numbered sensing lines respectively in the sensing lines with the sensing lines being input with the excitation signals and grounded alternately, and the driving lines being grounded;
    calculating self-capacitance differences corresponding to the two times of self-capacitance interlaced driving in each of the driving direction and the sensing direction, and obtaining an interlaced differential value of each channel based on the self-capacitance differences; and
    calculating a self-capacitance differential value of each channel, and determining a floating level of the channel based on the result of calculation.

2. The method according to claim 1, wherein the calculating self-capacitance differences corresponding to the two times of self-capacitance interlaced driving in each of the driving direction and the sensing direction, and obtaining an interlaced differential value of each channel based on the self-capacitance differences comprises:
    obtaining interlaced differential values on the driving lines based on the self-capacitance differences corresponding to the self-capacitance interlaced driving of the odd-numbered driving lines and the even-numbered driving lines in the driving lines; and
    obtaining interlaced differential values on the sensing lines based on the self-capacitance differences corresponding to the self-capacitance interlaced driving of the odd-numbered sensing lines and the even-numbered sensing lines in the sensing lines.

3. The method according to claim 2, wherein the calculating a self-capacitance differential value of each channel, and determining a floating level of the channel based on the result of calculation comprises:
    calculating floating levels of the driving lines based on the interlaced differential values on the driving lines and a number of nodes touched on the driving lines; and
    calculating floating levels of the sensing lines based on the interlaced differential values on the sensing lines and a number of nodes touched on the sensing lines.

4. A floating compensation method for a touch screen, comprising:
    performing two times of self-capacitance interlaced driving on the touch screen in a driving direction, wherein the performing two times of self-capacitance driving on the touch screen in a driving direction further comprises: acquiring signals from odd-numbered driving lines and even-numbered driving lines respectively in driving lines of the touch screen with the driving lines being input with excitation signals and grounded alternately, and sensing lines of the touch screen being grounded;
    performing two times of self-capacitance interlaced driving on the touch screen in a sensing direction, wherein the performing two times of self-capacitance driving on the touch screen in a sensing direction further comprises: acquiring signals from odd-numbered sensing lines and even-numbered sensing lines respectively in the sensing lines with the sensing lines being input with the excitation signals and grounded alternately, and the driving lines being grounded;
    calculating self-capacitance differences corresponding to the two times of self-capacitance interlaced driving in each of a driving direction and the sensing direction, and obtaining an interlaced differential value of each channel based on the self-capacitance differences;
    calculating a self-capacitance differential value of each channel, and determining a floating level of the channel based on the result of calculation; and determining a compensation factor of each node based on the floating level of each channel, and performing floating compensation based on the compensation factor and a mutual capacitance difference compensation reference.

5. The method according to claim 4, wherein the calculating self-capacitance differences corresponding to the two times of self-capacitance interlaced driving in each of the driving direction and the sensing direction, and obtaining an interlaced differential value of each channel based on the self-capacitance differences comprises:
obtaining interlaced differential values on the driving lines based on the self-capacitance differences corresponding to the self-capacitance interlaced driving of the odd-numbered driving lines and the even-numbered driving lines in the driving lines; and
obtaining interlaced differential values on the sensing lines based on the self-capacitance differences corresponding to the self-capacitance interlaced driving of the odd-numbered sensing lines and the even-numbered sensing lines in the sensing lines.

6. The method according to claim 5, wherein the calculating a self-capacitance differential value of each channel, and determining a floating level of the channel based on the result of calculation comprises:
calculating floating levels of the driving lines based on the interlaced differential values on the driving lines and a number of nodes touched on the driving lines; and
calculating floating levels of the sensing lines based on the interlaced differential values on the sensing lines and a number of nodes touched on the sensing lines.

7. The method according to claim 6, wherein the determining a compensation factor of each node based on the floating level of each channel, and performing floating compensation based on the compensation factor and a mutual capacitance difference compensation reference comprises:
determining a compensation factor of a node at an intersection of any two channels based on the floating level of each channel;
obtaining a difference increment of each node based on the compensation factor of each node and the mutual capacitance difference compensation reference; and
obtaining a mutual capacitance difference after compensation of each node based on the actual mutual capacitance difference before compensation of each node and the difference increment of each node.

8. The method according to claim 7, wherein the mutual capacitance difference compensation reference is a variable value set when the touch screen is not affected by floating factors.

9. An electronic device, comprising:
one or more processors; and
a storage medium, configured to store one or more programs,
wherein the one or more programs, when executed by the one or more processors, cause the one or more processors to implement a method, wherein the method comprising:
performing two times of self-capacitance interlaced driving on the touch screen in a driving direction, wherein the performing two times of self-capacitance driving on the touch screen in a driving direction further comprises: acquiring signals from odd-numbered driving lines and even-numbered driving lines respectively in driving lines of the touch screen with the driving lines being input with excitation signals and grounded alternately, and sensing lines of the touch screen being grounded;
performing two times of self-capacitance interlaced driving on the touch screen in a sensing direction, wherein the performing two times of self-capacitance driving on the touch screen in a sensing direction further comprises: acquiring signals from odd-numbered sensing lines and even-numbered sensing lines respectively in the sensing lines with the sensing lines being input with the excitation signals and grounded alternately, and the driving lines being grounded;
calculating self-capacitance differences corresponding to the two times of self-capacitance interlaced driving in each of the driving direction and the sensing direction, and obtaining an interlaced differential value of each channel based on the self-capacitance differences; and
calculating a self-capacitance differential value of each channel, and determining a floating level of the channel based on the result of calculation.

10. The electronic device according to claim 9, wherein the calculating self-capacitance differences corresponding to the two times of self-capacitance interlaced driving in each of the driving direction and the sensing direction, and obtaining an interlaced differential value of each channel based on the self-capacitance differences comprises:
obtaining interlaced differential values on the driving lines based on the self-capacitance differences corresponding to the self-capacitance interlaced driving of the odd-numbered driving lines and the even-numbered driving lines in the driving lines; and
obtaining interlaced differential values on the sensing lines based on the self-capacitance differences corresponding to the self-capacitance interlaced driving of the odd-numbered sensing lines and the even-numbered sensing lines in the sensing lines.

11. The electronic device according to claim 10, wherein the calculating a self-capacitance differential value of each channel, and determining a floating level of the channel based on the result of calculation comprises:
calculating floating levels of the driving lines based on the interlaced differential values on the driving lines and a number of nodes touched on the driving lines; and
calculating floating levels of the sensing lines based on the interlaced differential values on the sensing lines and a number of nodes touched on the sensing lines.

12. The electronic device according to claim 9, wherein the method further comprises:
determining a compensation factor of each node based on the floating level of each channel, and performing floating compensation based on the compensation factor and a mutual capacitance difference compensation reference.

13. The electronic device according to claim 12, wherein the calculating self-capacitance differences corresponding to the two times of self-capacitance interlaced driving in each of the driving direction and the sensing direction, and obtaining an interlaced differential value of each channel based on the self-capacitance differences comprises:
obtaining interlaced differential values on the driving lines based on the self-capacitance differences corresponding to the self-capacitance interlaced driving of the odd-numbered driving lines and the even-numbered driving lines in the driving lines; and
obtaining interlaced differential values on the sensing lines based on the self-capacitance differences corresponding to the self-capacitance interlaced driving of the odd-numbered sensing lines and the even-numbered sensing lines in the sensing lines.

14. The electronic device according to claim 13, wherein the calculating a self-capacitance differential value of each channel, and determining a floating level of the channel based on the result of calculation comprises:
   calculating floating levels of the driving lines based on the interlaced differential values on the driving lines and a number of nodes touched on the driving lines; and
   calculating floating levels of the sensing lines based on the interlaced differential values on the sensing lines and a number of nodes touched on the sensing lines.

15. The electronic device according to claim 14, wherein the determining a compensation factor of each node based on the floating level of each channel, and performing floating compensation based on the compensation factor and a mutual capacitance difference compensation reference comprises:
   determining a compensation factor of a node at an intersection of any two channels based on the floating level of each channel;
   obtaining a difference increment of each node based on the compensation factor of each node and the mutual capacitance difference compensation reference; and
   obtaining a mutual capacitance difference after compensation of each node based on the actual mutual capacitance difference before compensation of each node and the difference increment of each node.

16. The electronic device according to claim 15, wherein the mutual capacitance difference compensation reference is a variable value set when the touch screen is not affected by floating factors.

* * * * *